US010154365B2

(12) United States Patent
Silva

(10) Patent No.: US 10,154,365 B2
(45) Date of Patent: Dec. 11, 2018

(54) HEAD-RELATED TRANSFER FUNCTION MEASUREMENT AND APPLICATION

(71) Applicant: INTEL CORPORATION, Santa Clara, CA (US)

(72) Inventor: Andradige Pubudu Madhawa Silva, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 15/277,002

(22) Filed: Sep. 27, 2016

(65) Prior Publication Data

US 2018/0091921 A1    Mar. 29, 2018

(51) Int. Cl.
| | |
|---|---|
| H04S 7/00 | (2006.01) |
| G06T 19/00 | (2011.01) |
| G06T 15/08 | (2011.01) |
| G06T 17/20 | (2006.01) |
| G06T 7/00 | (2017.01) |
| G06K 9/00 | (2006.01) |

(52) U.S. Cl.
CPC ............. *H04S 7/304* (2013.01); *G06T 7/004* (2013.01); *G06T 15/08* (2013.01); *G06T 17/20* (2013.01); *G06T 19/006* (2013.01); *G06K 9/00288* (2013.01); *H04S 2420/01* (2013.01)

(58) Field of Classification Search
None
See application file for complete search history.

(56) References Cited

U.S. PATENT DOCUMENTS

| | | | |
|---|---|---|---|
| 7,012,637 B1 | 3/2006 | Blume | |
| 9,906,884 B2* | 2/2018 | Meshram | ................ H04S 7/303 |
| 2007/0183603 A1 | 8/2007 | Jin | |
| 2008/0306720 A1 | 12/2008 | Nicol | |
| 2012/0183161 A1 | 7/2012 | Agevik | |
| 2016/0269849 A1* | 9/2016 | Riggs | ..................... H04S 7/304 |

FOREIGN PATENT DOCUMENTS

WO    2012164346 A1    12/2012

OTHER PUBLICATIONS

International Search Report dated Oct. 31, 2017 for International Patent Application No. PCT/US2017/046308, 3 pages.

(Continued)

*Primary Examiner* — Paul Huber
(74) *Attorney, Agent, or Firm* — Finch & Maloney PLLC

(57) ABSTRACT

Techniques are provided for Head-Related Transfer Function (HRTF) measurement and sharing for audio applications. A methodology implementing the techniques according to an embodiment includes receiving a plurality of three-dimensional (3D)images of a user. The images are generated by a 3D camera or other image capture device, and each image is associated with a unique viewing angle or perspective of the user. The method also includes generating a 3D volume based on the 3D images and then generating a 3D mesh surface based on the 3D volume. The method further includes computing HRTFs associated with the user, based on the 3D mesh surface. Additionally, techniques are disclosed to provide a platform for sharing of the calculated HRTFs between audio applications executing on different devices.

24 Claims, 7 Drawing Sheets

(56) References Cited

OTHER PUBLICATIONS

Written Opinion of the International Searching Authority dated Oct. 31, 2017 for International Patent Application No. PCT/US2017/046308, 7 pages.
Katz, Brian, "Boundary element method calculation of individual head-related transfer function. I. Rigid model calculation", J Acoust Soc Am., Nov. 2001, pp. 2440-2448.

* cited by examiner

HEAD-RELATED TRANSFER FUNCTION MEASUREMENT AND APPLICATION

BACKGROUND

Head-related transfer functions (HRTFs) characterize sound transmission between specified points in space and the eardrum of a listener. These transfer functions describe how the sound is modified as it propagates along a direction through free space from a given point to the inner ear or eardrum. These modifications are generally caused by the shape of the listener's outer ear as well as the shape and posture of the listener's head and torso. Modelling of HRTFs for use in audio applications allows for more realistic rendering of sounds, particularly the rendering of localized sounds in virtual 3D environments.

HRTFs comprise a collection of transfer functions for each ear, and for each spatial direction (e.g., azimuth and elevation), which encode the frequency response of the listener to an impulsive sound. HRTFs capture the filtering effects of the listener's pinna (outer ear), head and torso. Since each individual's physical properties (anthropometry) differs, their HRTFs will also differ, and thus HRTF measurements need to be performed for each person. Unfortunately, however, acoustic HRTF measurement is a difficult task that is typically performed by trained technicians in a laboratory setting, with the use of specialized and expensive equipment. Additionally, invasive placement of measurement instrumentation in the subject's body is required. For example, traditional acoustic HRTF measurements are performed in an anechoic chamber using a speaker array mounted around individual miniaturized microphones placed inside the individual's ear canals. For these reasons, HRTF-based audio has remained impractical for common use, even in high end audio applications.

BRIEF DESCRIPTION OF THE DRAWINGS

Features and advantages of embodiments of the claimed subject matter will become apparent as the following Detailed Description proceeds, and upon reference to the Drawings, wherein like numerals depict like parts.

Figure 1:
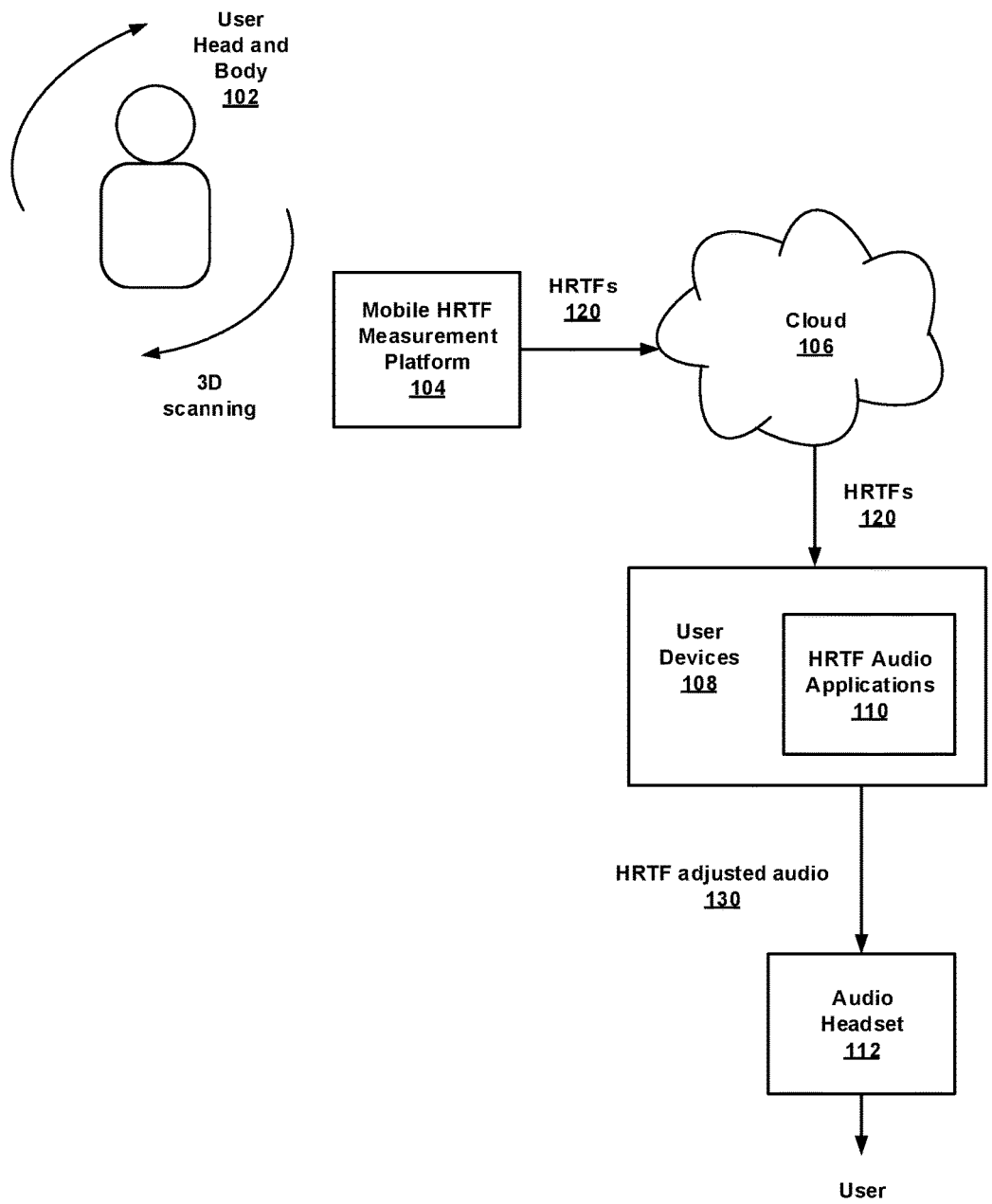
FIG. 1 is a top level diagram of an implementation of a system for HRTF measurement and application, configured in accordance with certain embodiments of the present disclosure.

Although the following Detailed Description will proceed with reference being made to illustrative embodiments, many alternatives, modifications, and variations thereof will be apparent in light of this disclosure.

DETAILED DESCRIPTION

Generally, this disclosure provides techniques for measurement and application of head-related transfer functions (HRTFs), based on three-dimensional (3D) imaging, for an improved user audio experience. HRTFs characterize sound transmission between points in space and the eardrum of a listener. These transfer functions describe how the sound is modified as it propagates along a direction through free space from a given point to the inner ear, and generally depend on the physical characteristics of the listener. The use of HRTFs in audio applications allows for an immersive audio experience, where sounds can seemingly be made to originate from different locations. The disclosed techniques provide for improved HRTF calculation, for an individual user, based on 3D image scanning. These techniques decrease cost and complexity compared to existing methods that rely on either acoustic or direct physical measurements of the subject, which can be error prone and difficult to obtain. Additionally, techniques are disclosed to provide a platform for sharing of the calculated HRTFs between audio applications executing on different devices.

In accordance with an embodiment, the disclosed techniques can be implemented, for example, in a computing system or a software product executable or otherwise controllable by such system. The system or product is configured to perform HRTF measurements by receiving a number of 3D images of a user, each from a unique viewing angle. For example, a 3D camera (or other such image capture device) may be rotated around the user whose HRTFs are to be measured, to scan the user from many angles. The system is further configured to generate a 3D volume based on the 3D images and generate a 3D mesh surface based on the 3D volume. HRTFs may then be computed for the user based on the 3D mesh surface which represents the individual's body structure. In some embodiments, the calculated HRTFs may be provided for use by an audio processing system for enhanced audio playback, for example through a sharing platform.

The techniques described herein for HRTF measurement can be implemented on a broad range of computing and communication platforms, including mobile devices such as a smartphone, tablet or laptop equipped with a 3D camera. These techniques may further be implemented in hardware or software or a combination thereof. Additionally, these techniques can be performed in an informal environment, such as a home setting, rather than a controlled laboratory environment. In some embodiments, the 3D camera may use stereoscopic and/or passive infrared imaging techniques. Passive imaging is typically less expensive, safer and more robust than active measurement systems, such as laser-based measurement systems, which rely on reflective surfaces and which can pose safety risks.

FIG. 1 is a top level diagram 100 of an implementation of a system for HRTF measurement and application, configured in accordance with certain embodiments of the present disclosure. A mobile HRTF measurement platform 104 is shown to provide 3D image scanning of a user or subject 102. In some embodiments, the subject's entire body may be scanned for greater HRTF measurement accuracy; while in other embodiments, the scan may be limited to the subject's head and upper body to reduce the computational burden. The mobile HRTF measurement platform 104 may be a smartphone, tablet, laptop, or other mobile computational or communication platform with 3D imaging capability. In some embodiments, the scanning may be accomplished by mounting the platform 104 on a circular track to provide automated circumferential motion of the platform 104 about the user 102 to obtain the 3D images from unique viewing angles. Alternatively, a second person may assist, by circling around the subject with the mobile platform in hand to obtain a sufficient number of 3D images from different perspectives.

The mobile HRTF measurement platform 104 is configured to generate HRTFs for the user based on the 3D image scans, as will be explained in greater detail below. The HRTFs may be used by audio applications local to the platform 104, or they may be transferred to a storage system such as cloud-based storage 106. In some embodiments, the HRTF measurement platform 104 may be configured to capture the 3D images and offload some or all of the HRTF calculations and/or 3D reconstruction calculations to another system or device (e.g., the cloud-based system 106). Other user devices 108 are shown to have access to the cloud-based system 106, from which HRTFs may be acquired and employed by audio applications 110 to provide improved HRTF adjusted audio 130 to the user through audio headset 112. In some embodiments, cloud-based system 106 may be any type of server computer system that is accessible through the Internet or other suitable network facilities so that the HRTFs (and associated user profile including user identification) can be shared among different devices.

Figure 2:
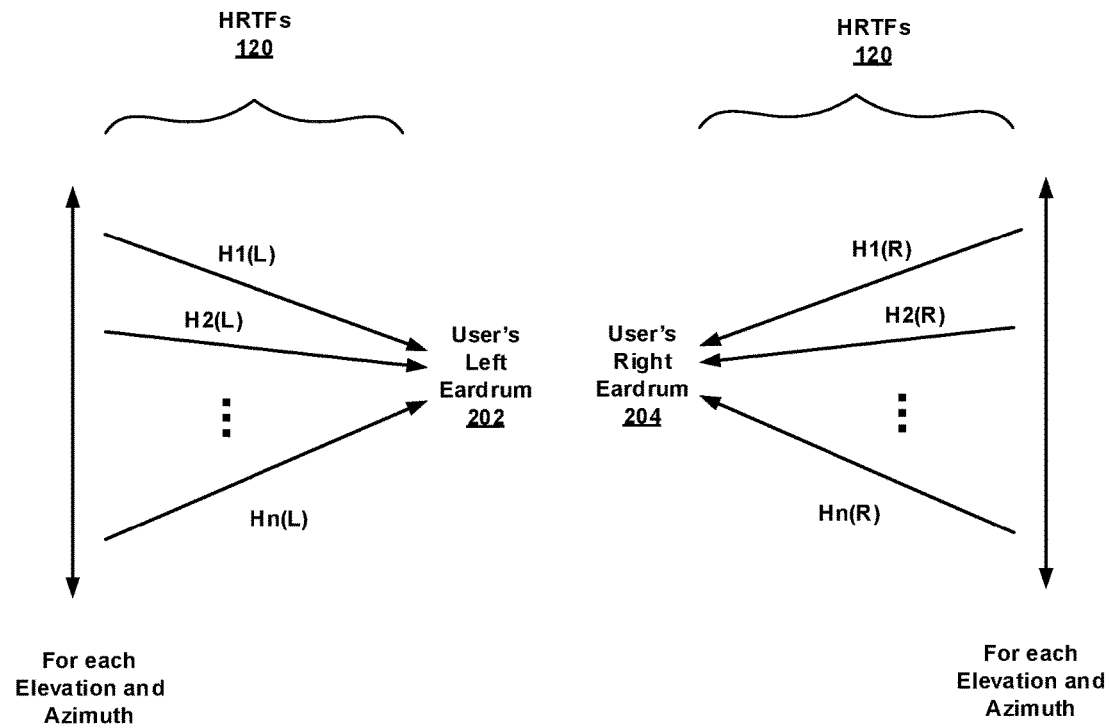
FIG. 2 illustrates an application of HRTFs, in accordance with certain embodiments of the present disclosure.

FIG. 2 illustrates an application of HRTFs 120, in accordance with certain embodiments of the present disclosure. Humans possess a capability for acoustic spatial perception (ASP) which enables them to formulate a mental picture of their surroundings without relying on vision. Humans accomplish ASP through the use of acoustic localizing cues which may be mathematically represented by HRTFs 120. In audio applications where experiences are re-produced or synthesized (e.g., movie/home theaters, virtual/augmented reality, computer games, and immersive environments), ASP facilitation provides an improved user experience. Through the use of HRTFs, it is possible to spatialize any non-spatial sound to facilitate ASP in the listener, when that sound is presented through stereo headphones. The HRTF is applied, as a filter, to the non-spatial sound to generate a spatial sound corresponding to that HRTF for any spatial location (e.g., a particular azimuth and elevation angle). In other words, the non-spatial sound is convolved with each corresponding HRTF to generate the spatialized sound. Two sets of HRTFs are generated, one for the left eardrum 202 and one for the right eardrum 204, since each ear generally has unique physical properties. Likewise, every individual has unique physical properties that require a unique set of HRTFs for successful spatialized sound presentation.

Figure 3:
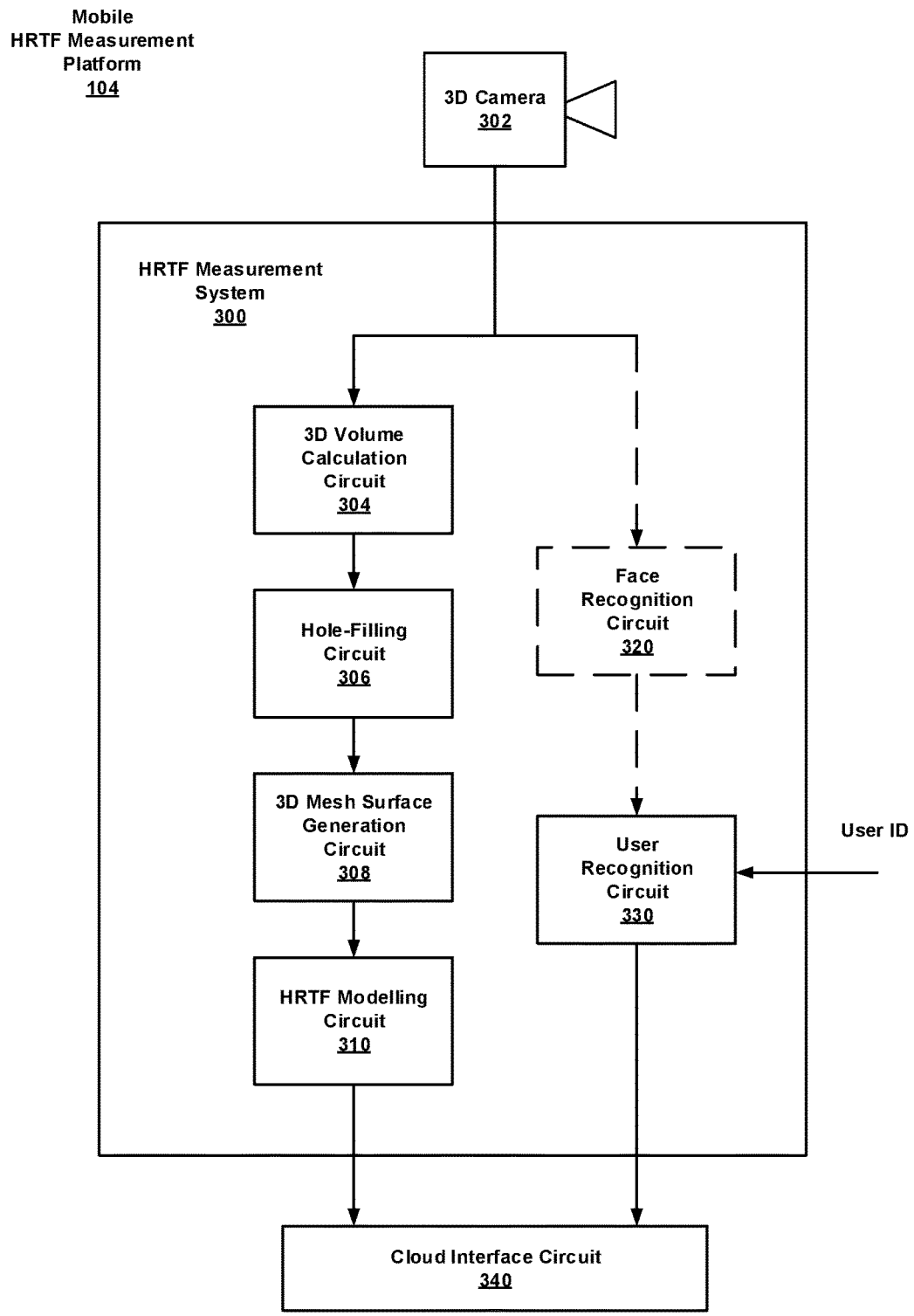
FIG. 3 is a more detailed block diagram of an HRTF measurement system, configured in accordance with certain embodiments of the present disclosure.

FIG. 3 is a more detailed block diagram of an HRTF measurement system 300, configured in accordance with certain embodiments of the present disclosure. The HRTF measurement system 300 is configured to compute HRTFs associated with an individual based on the subject's body surface structure, which is captured by 3D image scanning. The HRTF measurement system 300 is shown to include a 3D volume calculation circuit 304, a hole-filling circuit 306, a 3D mesh surface generation circuit 308, an HRTF modelling circuit 310, and a user recognition circuit 330. In some embodiments, HRTF measurement system 300 may also include a face recognition circuit 320. In some embodiments, HRTF measurement system 300 may be incorporated into a mobile HRTF measurement platform, as shown, which also includes a 3D camera 302 and a cloud interface circuit 340.

The 3D volume calculation circuit 304 is configured to generate a 3D volume based on a number of received 3D images of a user for which the HRTF is to be modelled. Each 3D image is associated with a unique viewing angle or perspective (e.g., a different azimuth and elevation). The 3D images may be provided by 3D camera 302 or any other suitable 3D imaging source. In some embodiments, for example where the camera lens has a field of view of 180 degrees or more, a single image may be sufficient. The generated 3D volume represents the individual's head and body structure. In some embodiments, the subject's entire body may be scanned for greater HRTF measurement accuracy; while in other embodiments, the scan may be limited to the subject's head and upper body to reduce the computational burden. The 3D volume be generated from the 3D images using known techniques in light of the present disclosure.

The hole-filling circuit 306 is configured to process the 3D volume to fill in holes that may be present due to gaps in the scanning process. Hole-filling may be accomplished using known techniques, such as interpolation, in light of the present disclosure. The 3D mesh surface generation circuit 308 is configured to generate a 3D mesh surface based on the 3D volume. The mesh surface represents the surface structure of the subject individual, upon which the HRTF models will be based. Mesh surface generation may be accomplished using known techniques in light of the present disclosure.

The HRTF modelling circuit 310 is configured to compute a set of HRTFs associated with the user (for both ears), based on the 3D mesh surface. The HRTF computation may be based on one or more of a boundary element calculation, an expectation maximization calculation, a clustering based calculation, or an anthropometric measurement calculation. In some embodiments, the HRTF computation may be implemented using other known techniques, in light of the present disclosure. In some embodiments, the user is able to select a preferred HRTF computation technique depending on the particular requirements for accuracy and speed.

In some embodiments, the HRTF computation tasks may be transferred to a cloud-based processor, for example, if the computational burden is too great for the processing capabilities of a handheld mobile device. In such case, the computed HRTFs are retrieved from the cloud-based system 106 back to the mobile platform 104 for use by any local HRTF-capable audio applications executing on the mobile platform.

The user recognition circuit 330 is configured to determine an identification of the user. In some embodiments, the user may be self-identified, for example through a sign on process where credentials are provided. In some embodiments, a facial recognition circuit 320 is configured to determine an identification of the user based on facial recognition applied to one or more of the 3D images of the user. The term "facial recognition," as used herein may be understood to include recognition of the user based on any part of the user's face, and may therefore include eye-based recognition techniques in light of the present disclosure. In some embodiments, the identification may be one component of a user profile which may include the HRTFs and any other additional information associated with the user, such as preference information, that may be useful in an audio application. The cloud interface circuit 340 is configured to transfer the computed HRTF and/or the associated user profile between the platform 104 and the cloud-based system 106.

Figure 4:
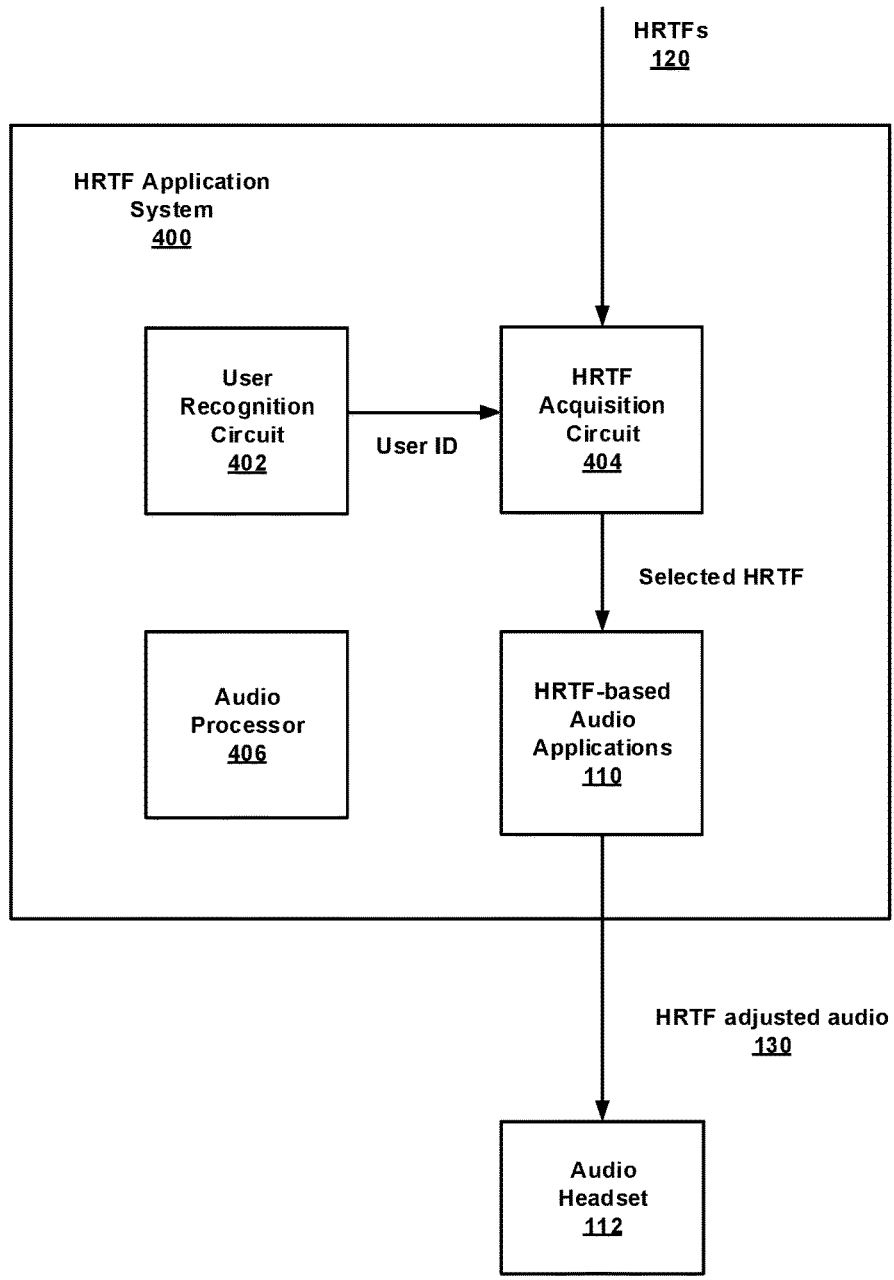
FIG. 4 is a more detailed block diagram of an audio device for HRTF application, configured in accordance with certain embodiments of the present disclosure.

FIG. 4 is a more detailed block diagram of a user audio device 108 for application of computed HRTFs to audio, configured in accordance with certain embodiments of the present disclosure. The user audio device 108 may be a smartphone, tablet, laptop, or other suitable device configured to provide audio to a user. The user audio device 108 is shown to include an HRTF application system 400 and a stereo audio headset 112. The HRTF application system 400 is shown to further include an HRTF acquisition circuit 404, an audio processor 406, HRTF-based audio applications 110, and a user recognition circuit 402.

The user recognition circuit 402 is configured to identify the user of the audio device. In some embodiments, the user may be self-identified, for example through a sign-on process where credentials are provided. In some embodiments, the user may be identified through facial recognition, and a camera (not shown) may be provided to supply images for this purpose.

When that user invokes an application that can utilize HRTFs to spatialize audio output, the user's HRTFs are downloaded and provided to the application. The HRTF acquisition circuit 404 is configured to acquire an HRTF, associated with the user of the audio device, from an HRTF storage system 106. In some embodiments, the HRTF storage system 106 may be cloud-based.

The audio processor 406 is configured to execute one or more of the HRTF-based audio applications 110, using the acquired HRTFs, to generate HRTF adjusted audio for the user. In some embodiments, the audio applications 110 may be third party applications. The HRTF adjusted audio provides acoustic spatial perception (ASP) for an improved user experience. The HRTF-based audio applications 110 may include music players, video players, games, home theater systems, and the like. These applications are configured to apply the acquired HRTFs to the audio signals that are provided to the user through the stereo audio headset 112.

The disclosed techniques enable calculated HRTFs, based on 3D image scans, to be shared across other applications 110, whether running on the same device 104 or other devices 108 connected, for example, to the cloud-based storage system 106. For example the HRTFs can be measured using a smartphone and the user can later benefit from those measured HRTFs while watching a movie on his or her smart TV.

Methodology

Figure 5:
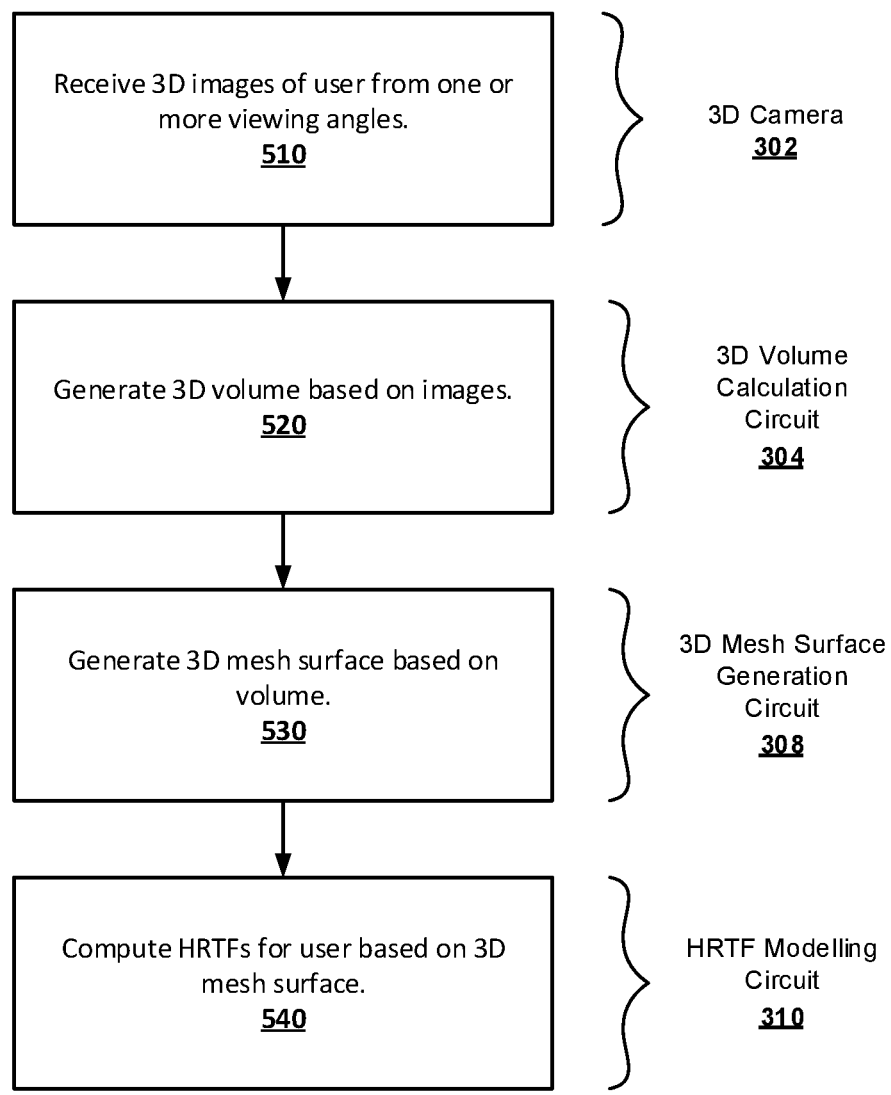
FIG. 5 is a flowchart illustrating a methodology for HRTF measurement, in accordance with certain embodiments of the present disclosure.

FIG. 5 is a flowchart illustrating an example method 500 for HRTF measurement, in accordance with certain embodiments of the present disclosure. As can be seen, example method 500 includes a number of phases and sub-processes, the sequence of which may vary from one embodiment to another. However, when considered in the aggregate, these phases and sub-processes form a process for HRTF measurement in accordance with certain of the embodiments disclosed herein. These embodiments can be implemented, for example using the system architecture illustrated in FIG. 3 as described above. However other system architectures can be used in other embodiments, as will be apparent in light of this disclosure. To this end, the correlation of the various functions shown in FIG. 5 to the specific components illustrated in the other figures is not intended to imply any structural and/or use limitations. Rather, other embodiments may include, for example, varying degrees of integration wherein multiple functionalities are effectively performed by one system. For example, in an alternative embodiment a single module can be used to perform all of the functions of method 500. Thus other embodiments may have fewer or more modules and/or sub-modules depending on the granularity of implementation. In still other embodiments, the methodology depicted can be implemented as a computer program product including one or more non-transitory machine readable mediums that when executed by one or more processors cause the methodology to be carried out. Numerous variations and alternative configurations will be apparent in light of this disclosure.

As illustrated in FIG. 5, in one embodiment, method 500 for HRTF measurement commences by receiving, at operation 510, 3D images of the subject or user for which HRTFs are desired. The 3D images are obtained from a number of different viewing angles or perspectives (e.g., different azimuth and elevation angles of an image capture device) in order to capture a complete data set of the user's head and body. In some embodiments, the images may be limited to the user's upper body and head region.

Next, at operation 520, a 3D volume reconstruction of the user is generated or estimated, based on the collection of captured 3D images. At operation 530, a 3D mesh surface is generated, based on the 3D volume. At operation 540, HRTFs are computed for the user, based on the 3D mesh surface. In some embodiments, the HRTF computation employs a modelling technique based on one or more of boundary element calculations, expectation maximization calculations, clustering, or anthropometric measurements.

Of course, in some embodiments, additional operations may be performed, as previously described in connection with the system. For example, the user may be identified and the user ID may be stored, along with the computed HRTF on a cloud-based system. In some embodiments, the user identification may be based on facial recognition, for example from the image captures. Further additional operations may include mounting the 3D image capture device on a circular track to facilitate circumferential motion of the 3D image capture device about the user, to obtain the plurality of 3D images from unique viewing angles.

Figure 6:
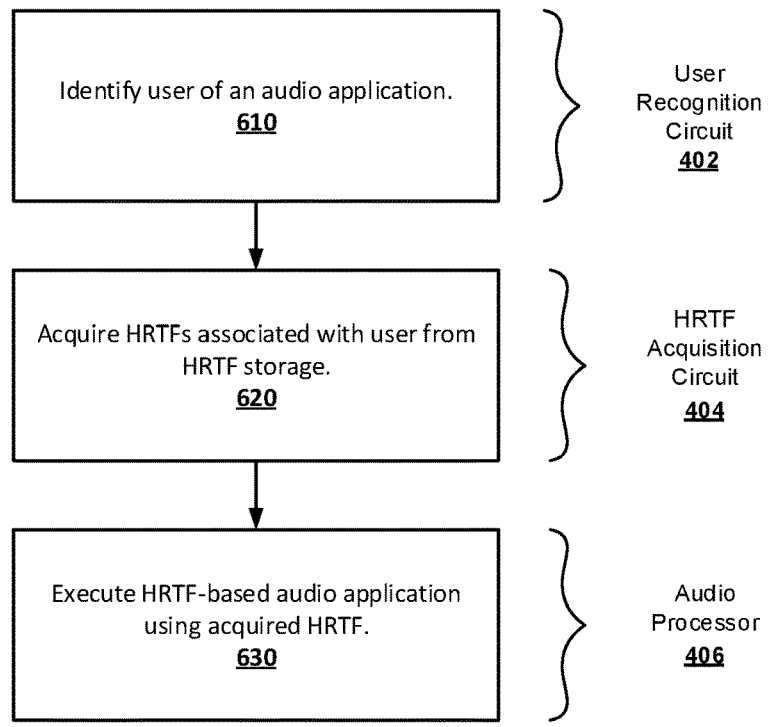
FIG. 6 is a flowchart illustrating a methodology for HRTF application, in accordance with certain embodiments of the present disclosure.

FIG. 6 is a flowchart illustrating an example method 600 for HRTF application and sharing, in accordance with certain embodiments of the present disclosure. As can be seen, example method 600 includes a number of phases and sub-processes, the sequence of which may vary from one embodiment to another. However, when considered in the aggregate, these phases and sub-processes form a process for HRTF application in accordance with certain of the embodiments disclosed herein. These embodiments can be implemented, for example using the system architecture illustrated in FIG. 4 as described above. However other system architectures can be used in other embodiments, as will be apparent in light of this disclosure. To this end, the correlation of the various functions shown in FIG. 6 to the specific components illustrated in the other figures is not intended to imply any structural and/or use limitations. Rather, other embodiments may include, for example, varying degrees of integration wherein multiple functionalities are effectively performed by one system. For example, in an alternative embodiment a single module can be used to perform all of the functions of method 600. Thus other embodiments may have fewer or more modules and/or sub-modules depending on the granularity of implementation. In still other embodiments, the methodology depicted can be implemented as a computer program product including one or more non-transitory machine readable mediums that when executed by one or more processors cause the methodology to be carried out. Numerous variations and alternative configurations will be apparent in light of this disclosure.

As illustrated in FIG. 6, in one embodiment, method 600 for HRTF application commences by identifying, at operation 610, the user of an audio device or audio application. In some embodiments, the identification may be based on facial recognition. Next, at operation 620, HRTFs associated with the identified user are acquired, for example from an HRTF storage. In some embodiments, the HRTFs may be stored on a cloud-based system. At operation 630, an HRTF-based audio application is executed. The audio application employs the acquired HRTFs to generate HRTF adjusted audio for the user create an enhanced listening experience. The HRTF adjusted audio is provided through a headset, earphones, or similar mechanism.

Example System

Figure 7:
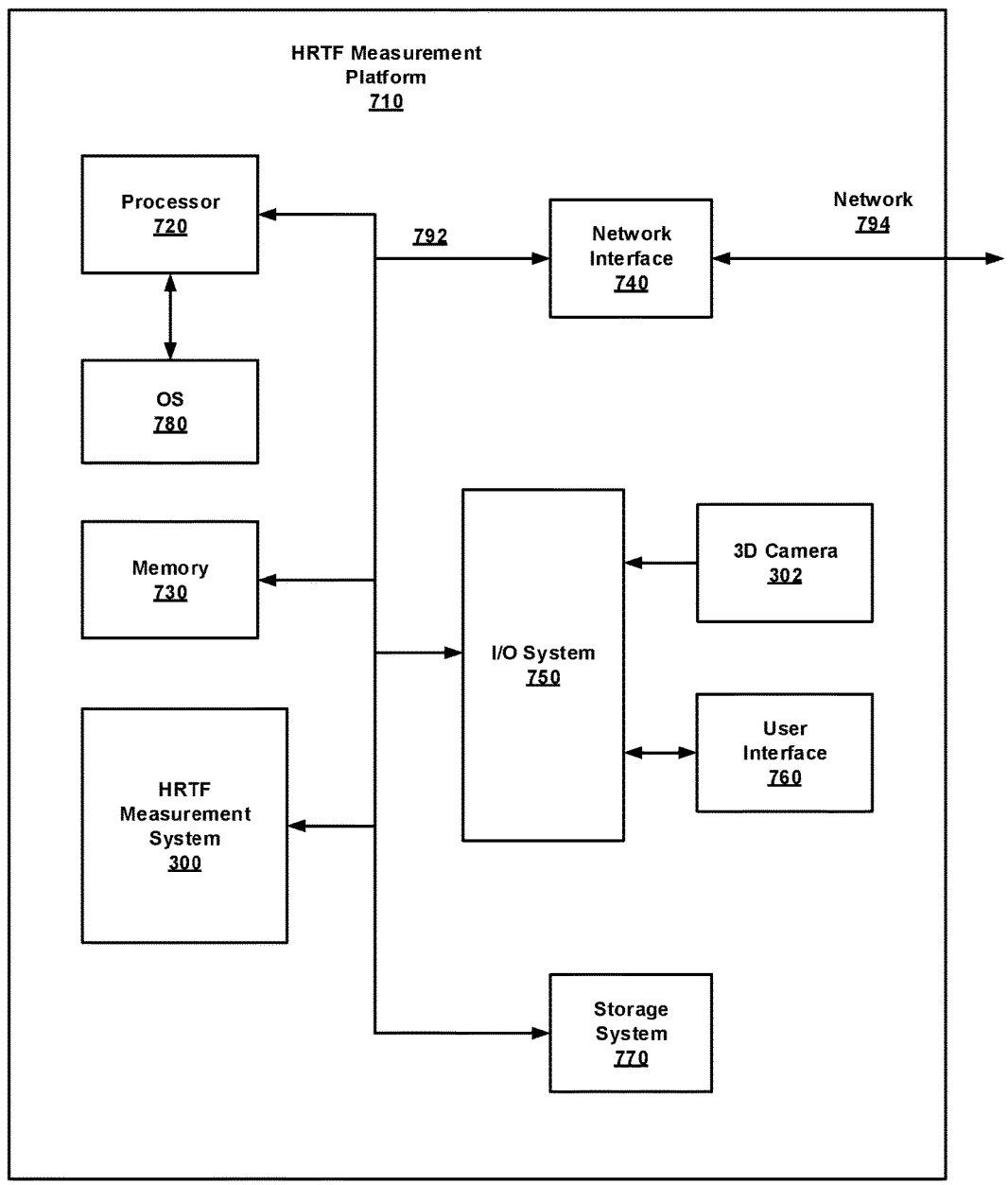
FIG. 7 is a block diagram schematically illustrating a system platform to perform HRTF measurement, configured in accordance with certain embodiments of the present disclosure.

FIG. 7 illustrates an example system 700 to perform head-related transfer function (HRTF) measurement, configured in accordance with certain embodiments of the present disclosure. In some embodiments, system 700 comprises a platform 710 which may host, or otherwise be incorporated into a personal computer, workstation, laptop computer, ultra-laptop computer, tablet, touchpad, portable computer, handheld computer, palmtop computer, personal digital assistant (PDA), cellular telephone, combination cellular telephone and PDA, smart device (for example, smartphone or smart tablet), mobile Internet device (MID), messaging device, data communication device, and so forth. Any combination of different devices may be used in certain embodiments. In some embodiments, platform 710 may be a mobile HRTF measurement platform 104 with an integrated 3D camera 302, such as, for example, a smartphone or tablet, configured to facilitate scanning of the subject or user for which the HRTFs are desired.

In some embodiments, platform 710 may comprise any combination of a processor 720, a memory 730, HRTF measurement system 300, a network interface 740, an input/output (I/O) system 750, a 3D camera 302, a user interface 760 and a storage system 770. As can be further seen, a bus and/or interconnect 792 is also provided to allow for communication between the various components listed above and/or other components not shown. Platform 710 can be coupled to a network 794 through network interface 740 to allow for communications with other computing devices, platforms or resources. Other componentry and functionality not reflected in the block diagram of FIG. 7 will be apparent in light of this disclosure, and it will be appreciated that other embodiments are not limited to any particular hardware configuration.

Processor 720 can be any suitable processor, and may include one or more coprocessors or controllers, such as an audio processor or a graphics processing unit, to assist in control and processing operations associated with system 700. In some embodiments, the processor 720 may be implemented as any number of processor cores. The processor (or processor cores) may be any type of processor, such as, for example, a micro-processor, an embedded processor, a digital signal processor (DSP), a graphics processor (GPU), a network processor, a field programmable gate array or other device configured to execute code. The processors may be multithreaded cores in that they may include more than one hardware thread context (or "logical processor") per core. Processor 720 may be implemented as a complex instruction set computer (CISC) or a reduced instruction set computer (RISC) processor. In some embodiments, processor 720 may be configured as an x86 instruction set compatible processor.

Memory 730 can be implemented using any suitable type of digital storage including, for example, flash memory and/or random access memory (RAM). In some embodiments, the memory 730 may include various layers of memory hierarchy and/or memory caches as are known to those of skill in the art. Memory 730 may be implemented as a volatile memory device such as, but not limited to, a RAM, dynamic RAM (DRAM), or static RAM (SRAM) device. Storage system 770 may be implemented as a non-volatile storage device such as, but not limited to, one or more of a hard disk drive (HDD), a solid state drive (SSD), a universal serial bus (USB) drive, an optical disk drive, tape drive, an internal storage device, an attached storage device, flash memory, battery backed-up synchronous DRAM (SDRAM), and/or a network accessible storage device. In some embodiments, storage 770 may comprise technology to increase the storage performance enhanced protection for valuable digital media when multiple hard drives are included.

Processor 720 may be configured to execute an Operating System (OS) 780 which may comprise any suitable operating system, such as Google Android (Google Inc., Mountain View, Calif.), Microsoft Windows (Microsoft Corp., Redmond, Wash.), Apple OS X (Apple Inc., Cupertino, Calif.), or other Linux/Unix based operating systems such as Ubuntu and CentOS. As will be appreciated in light of this disclosure, the techniques provided herein can be implemented without regard to the particular operating system provided in conjunction with system 700, and therefore may also be implemented using any suitable existing or subsequently-developed platform.

Network interface circuit 740 can be any appropriate network chip or chipset which allows for wired and/or wireless connection between other components of computer system 700 and/or network 794, thereby enabling system 700 to communicate with other local and/or remote computing systems, servers, and/or resources. Wired communication may conform to existing (or yet to developed) standards, such as, for example, Ethernet. Wireless communication may conform to existing (or yet to developed) standards, such as, for example, cellular communications including LTE (Long Term Evolution), Wireless Fidelity (Wi-Fi), Bluetooth, and/or Near Field Communication (NFC). Exemplary wireless networks include, but are not limited to, wireless local area networks, wireless personal area networks, wireless metropolitan area networks, cellular networks, and satellite networks.

I/O system 750 may be configured to interface between various I/O devices and other components of computer system 700. I/O devices may include, but not be limited to a 3D camera 302, a user interface 760, and other devices not shown such as a display element, keyboard, mouse, touchpad, touch screen, speaker, headset, microphone, etc. I/O system 750 may include a graphics subsystem configured to perform processing of images for a display element. Graphics subsystem may be a graphics processing unit or a visual processing unit (VPU), for example. An analog or digital interface may be used to communicatively couple graphics subsystem and the display element. For example, the interface may be any of a high definition multimedia interface (HDMI), DisplayPort, wireless HDMI, and/or any other suitable interface using wireless high definition compliant techniques. In some embodiments, the graphics subsystem could be integrated into processor 720 or any chipset of platform 710.

It will be appreciated that in some embodiments, the various components of the system 700 may be combined or integrated in a system-on-a-chip (SoC) architecture. In some embodiments, the components may be hardware components, firmware components, software components or any suitable combination of hardware, firmware or software.

HRTF measurement system 300 is configured to measure or estimate the head-related transfer functions for a subject or user of the system. The measurement is based on a collection of 3D images of the user obtained from a number of different perspectives (e.g., azimuth and elevation angles). These 3D images are used to build a 3D volume and to generate a mesh surface model from which the HRTFs can be modelled. HRTF measurement performed in this manner, based on 3D image captures, provides more convenient, efficient and accurate HRTF modelling performance compared to conventional techniques that employ acoustic measurements under controlled conditions. HRTF measurement system 300 may include any or all of the components illustrated in FIGS. 3 and 4, as described above. HRTF measurement system 300 can be implemented or otherwise used in conjunction with a variety of suitable software and/or hardware that is coupled to or that otherwise forms a part of platform 710. HRTF measurement system 300 can additionally or alternatively be implemented or otherwise used in conjunction with user I/O devices that are capable of providing information to, and receiving information and commands from, a user. These I/O devices may include devices collectively referred to as user interface 760. In some embodiments, user interface 760 may include a textual input device such as a keyboard, and a pointer-based input device such as a mouse. Other input/output devices that may be used in other embodiments include a display element, touchscreen, a touchpad, and/or a speaker. Still other input/output devices can be used in other embodiments.

In some embodiments, HRTF measurement system 300 may be installed local to system 700, as shown in the example embodiment of FIG. 7. Alternatively, system 700 can be implemented in a client-server arrangement wherein at least some functionality associated with these circuits is provided to system 700 using an applet, such as a JavaScript applet, or other downloadable module. Such a remotely accessible module or sub-module can be provisioned in real-time, in response to a request from a client computing system for access to a given server having resources that are of interest to the user of the client computing system. In such embodiments the server can be local to network 794 or remotely coupled to network 794 by one or more other networks and/or communication channels. In some cases access to resources on a given network or computing system may require credentials such as usernames, passwords, and/or compliance with any other suitable security mechanism.

In various embodiments, system 700 may be implemented as a wireless system, a wired system, or a combination of both. When implemented as a wireless system, system 700 may include components and interfaces suitable for communicating over a wireless shared media, such as one or more antennae, transmitters, receivers, transceivers, amplifiers, filters, control logic, and so forth. An example of wireless shared media may include portions of a wireless spectrum, such as the radio frequency spectrum and so forth. When implemented as a wired system, system 700 may include components and interfaces suitable for communicating over wired communications media, such as input/output adapters, physical connectors to connect the input/output adaptor with a corresponding wired communications medium, a network interface card (NIC), disc controller, video controller, audio controller, and so forth. Examples of wired communications media may include a wire, cable metal leads, printed circuit board (PCB), backplane, switch fabric, semiconductor material, twisted pair wire, coaxial cable, fiber optics, and so forth.

Various embodiments may be implemented using hardware elements, software elements, or a combination of both. Examples of hardware elements may include processors, microprocessors, circuits, circuit elements (for example, transistors, resistors, capacitors, inductors, and so forth), integrated circuits, ASICs, programmable logic devices, digital signal processors, FPGAs, logic gates, registers, semiconductor devices, chips, microchips, chipsets, and so forth. Examples of software may include software components, programs, applications, computer programs, application programs, system programs, machine programs, operating system software, middleware, firmware, software modules, routines, subroutines, functions, methods, procedures, software interfaces, application program interfaces, instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power level, heat tolerances, processing cycle budget, input data rates, output data rates, memory resources, data bus speeds, and other design or performance constraints.

Some embodiments may be described using the expression "coupled" and "connected" along with their derivatives. These terms are not intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still cooperate or interact with each other.

The various embodiments disclosed herein can be implemented in various forms of hardware, software, firmware, and/or special purpose processors. For example, in one embodiment at least one non-transitory computer readable storage medium has instructions encoded thereon that, when executed by one or more processors, cause one or more of the HRTF measurement and application methodologies disclosed herein to be implemented. The instructions can be encoded using a suitable programming language, such as C, C++, object oriented C, Java, JavaScript, Visual Basic .NET, Beginner's All-Purpose Symbolic Instruction Code (BASIC), or alternatively, using custom or proprietary instruction sets. The instructions can be provided in the form of one or more computer software applications and/or applets that are tangibly embodied on a memory device, and that can be executed by a computer having any suitable architecture. In one embodiment, the system can be hosted on a given website and implemented, for example, using JavaScript or another suitable browser-based technology. For instance, in certain embodiments, the system may leverage processing resources provided by a remote computer system accessible via network 794. In other embodiments, the functionalities disclosed herein can be incorporated into other software applications including audio processing applications. The computer software applications disclosed herein may include any number of different modules, sub-modules, or other components of distinct functionality, and can provide information to, or receive information from, still other components. These modules can be used, for example, to communicate with input and/or output devices such as a display screen, a touch sensitive surface, a printer, and/or any other suitable device. Other componentry and functionality not reflected in the illustrations will be apparent in light of this disclosure, and it will be appreciated that other embodiments are not limited to any particular hardware or software configuration. Thus in other embodiments system 700 may comprise additional, fewer, or alternative subcomponents as compared to those included in the example embodiment of FIG. 7.

The aforementioned non-transitory computer readable medium may be any suitable medium for storing digital information, such as a hard drive, a server, a flash memory, and/or random access memory (RAM), or a combination of memories. In alternative embodiments, the components and/or modules disclosed herein can be implemented with hardware, including gate level logic such as a field-programmable gate array (FPGA), or alternatively, a purpose-built semiconductor such as an application-specific integrated circuit (ASIC). Still other embodiments may be implemented with a microcontroller having a number of input/output ports for receiving and outputting data, and a number of embedded routines for carrying out the various functionalities disclosed herein. It will be apparent that any suitable combination of hardware, software, and firmware can be used, and that other embodiments are not limited to any particular system architecture.

Some embodiments may be implemented, for example, using a machine readable medium or article which may store an instruction or a set of instructions that, if executed by a machine, may cause the machine to perform a method and/or operations in accordance with the embodiments. Such a machine may include, for example, any suitable processing platform, computing platform, computing device, processing device, computing system, processing system, computer, process, or the like, and may be implemented using any suitable combination of hardware and/or software. The machine readable medium or article may include, for example, any suitable type of memory unit, memory device, memory article, memory medium, storage device, storage article, storage medium, and/or storage unit, such as memory, removable or non-removable media, erasable or non-erasable media, writeable or rewriteable media, digital or analog media, hard disk, floppy disk, compact disk read only memory (CD-ROM), compact disk recordable (CD-R) memory, compact disk rewriteable (CR-RW) memory, optical disk, magnetic media, magneto-optical media, removable memory cards or disks, various types of digital versatile disk (DVD), a tape, a cassette, or the like. The instructions may include any suitable type of code, such as source code, compiled code, interpreted code, executable code, static code, dynamic code, encrypted code, and the like, implemented using any suitable high level, low level, object oriented, visual, compiled, and/or interpreted programming language.

Unless specifically stated otherwise, it may be appreciated that terms such as "processing," "computing," "calculating," "determining," or the like refer to the action and/or process of a computer or computing system, or similar electronic computing device, that manipulates and/or transforms data represented as physical quantities (for example, electronic) within the registers and/or memory units of the computer system into other data similarly represented as physical quantities within the registers, memory units, or other such information storage transmission or displays of the computer system. The embodiments are not limited in this context.

The terms "circuit" or "circuitry," as used in any embodiment herein, are functional and may comprise, for example, singly or in any combination, hardwired circuitry, programmable circuitry such as computer processors comprising one or more individual instruction processing cores, state machine circuitry, and/or firmware that stores instructions executed by programmable circuitry. The circuitry may include a processor and/or controller configured to execute one or more instructions to perform one or more operations described herein. The instructions may be embodied as, for example, an application, software, firmware, etc. configured to cause the circuitry to perform any of the aforementioned operations. Software may be embodied as a software package, code, instructions, instruction sets and/or data recorded on a computer-readable storage device. Software may be embodied or implemented to include any number of processes, and processes, in turn, may be embodied or implemented to include any number of threads, etc., in a hierarchical fashion. Firmware may be embodied as code, instructions or instruction sets and/or data that are hard-coded (e.g., nonvolatile) in memory devices. The circuitry may, collectively or individually, be embodied as circuitry that forms part of a larger system, for example, an integrated circuit (IC), an application-specific integrated circuit (ASIC), a system on-chip (SoC), desktop computers, laptop computers, tablet computers, servers, smart phones, etc. Other embodiments may be implemented as software executed by a programmable control device. In such cases, the terms "circuit" or "circuitry" are intended to include a combination of software and hardware such as a programmable control device or a processor capable of executing the software. As described herein, various embodiments may be implemented using hardware elements, software elements, or any combination thereof. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth.

Numerous specific details have been set forth herein to provide a thorough understanding of the embodiments. It will be understood by an ordinarily-skilled artisan, however, that the embodiments may be practiced without these specific details. In other instances, well known operations, components and circuits have not been described in detail so as not to obscure the embodiments. It can be appreciated that the specific structural and functional details disclosed herein may be representative and do not necessarily limit the scope of the embodiments. In addition, although the subject matter has been described in language specific to structural features and/or methodological acts, it is to be understood that the subject matter defined in the appended claims is not necessarily limited to the specific features or acts described herein. Rather, the specific features and acts described herein are disclosed as example forms of implementing the claims.

Further Example Embodiments

The following examples pertain to further embodiments, from which numerous permutations and configurations will be apparent.

Example 1 is a processor-implemented method for Head-Related Transfer Function (HRTF) measurement. The method comprises: receiving, by a processor, one or more three-dimensional (3D) images of a user, each 3D image associated with a unique viewing angle of a 3D image capture device; generating, by the processor, a 3D volume based on the 3D images; generating, by the processor, a 3D mesh surface based on the 3D volume; and computing, by the processor, an HRTF associated with the user, based on the 3D mesh surface.

Example 2 includes the subject matter of Example 1, wherein the HRTF computation employs one of a boundary element based calculation, an expectation maximization based calculation, a clustering based calculation, or an anthropometric measurement based calculation.

Example 3 includes the subject matter of Examples 1 or 2, wherein the HRTF computation is performed on the image capture device.

Example 4 includes the subject matter of any of Examples 1-3, wherein the HRTF computation is performed on a cloud-based processor.

Example 5 includes the subject matter of any of Examples 1-4, further comprising determining an identification of the user, and storing the computed HRTF and the user identification on a cloud-based system.

Example 6 includes the subject matter of any of Examples 1-5, wherein the viewing angles of each 3D image encompass the head and upper body of the user.

Example 7 includes the subject matter of any of Examples 1-6, further comprising determining an identification of the user based on facial recognition applied to one or more of the 3D images of the user.

Example 8 includes the subject matter of any of Examples 1-7, further comprising mounting the 3D image capture device on a circular track to facilitate circumferential motion of the 3D image capture device about the user, to obtain the plurality of 3D images from the unique viewing angles.

Example 9 includes the subject matter of any of Examples 1-8, further comprising generating HRTF adjusted audio to provide acoustic spatial perception to the user.

Example 10 is a processor-implemented method for Head-Related Transfer Function (HRTF) application. The method comprises: identifying, by a processor, a user of an audio application; acquiring, by the processor, an HRTF from an HRTF storage system, the HRTF associated with the user; and executing, by the processor, an HRTF-based audio application using the acquired HRTF to generate HRTF adjusted audio for the user.

Example 11 includes the subject matter of Example 10, wherein the HRTF storage system is cloud-based.

Example 12 includes the subject matter of Examples 10 or 11, further comprising providing the HRTF adjusted audio to the user through an audio headset to provide acoustic spatial perception to the user.

Example 13 includes the subject matter of any of Examples 10-12, wherein the identifying of the user further comprises performing facial recognition.

Example 14 is a system for Head-Related Transfer Function (HRTF) measurement. The system comprises: a three-dimensional (3D) volume calculation circuit to generate a 3D volume based on one or more received 3D images of a user, each 3D image associated with a unique viewing angle of a 3D camera; a 3D mesh surface generation circuit to generate a 3D mesh surface based on the 3D volume; and an HRTF modelling circuit to compute an HRTF associated with the user, based on the 3D mesh surface.

Example 15 includes the subject matter of Example 14, wherein the HRTF modelling circuit is further to perform one of a boundary element based calculation, an expectation maximization based calculation, a clustering based calculation, or an anthropometric measurement based calculation to compute the HRTF.

Example 16 includes the subject matter of Examples 14 or 15, further comprising a user recognition circuit to determine an identification of the user, and a cloud interface circuit to store the computed HRTF and the user identification to a cloud-based system.

Example 17 includes the subject matter of any of Examples 14-16, wherein the viewing angles of each 3D image encompass the head and upper body of the user.

Example 18 includes the subject matter of any of Examples 14-17, further comprising a facial recognition circuit to determining an identification of the user based on facial recognition applied to one or more of the 3D images of the user.

Example 19 is at least one non-transitory computer readable storage medium having instructions encoded thereon that, when executed by one or more processors, result in the following operations for Head-Related Transfer Function (HRTF) measurement. The operations comprise: receiving one or more three-dimensional (3D) images of a user, each 3D image associated with a unique viewing angle of a 3D image capture device; generating a 3D volume based on the 3D images; generating a 3D mesh surface based on the 3D volume; and computing an HRTF associated with the user, based on the 3D mesh surface.

Example 20 includes the subject matter of Example 19, wherein the HRTF computation employs one of a boundary element based calculation, an expectation maximization based calculation, a clustering based calculation, or an anthropometric measurement based calculation.

Example 21 includes the subject matter of Examples 19 or 20, wherein the HRTF computation is performed on the image capture device.

Example 22 includes the subject matter of any of Examples 19-21, wherein the HRTF computation is performed on a cloud-based processor.

Example 23 includes the subject matter of any of Examples 19-22, the operations further comprising determining an identification of the user, and storing the computed HRTF and the user identification on a cloud-based system.

Example 24 includes the subject matter of any of Examples 19-23, wherein the viewing angles of each 3D image encompass the head and upper body of the user.

Example 25 includes the subject matter of any of Examples 19-24, the operations further comprising determining an identification of the user based on facial recognition applied to one or more of the 3D images of the user.

Example 26 is a system for Head-Related Transfer Function (HRTF) measurement. The system comprises: means for receiving one or more three-dimensional (3D) images of a user, each 3D image associated with a unique viewing angle of a 3D image capture device; means for generating a 3D volume based on the 3D images; means for generating a 3D mesh surface based on the 3D volume; and means for computing an HRTF associated with the user, based on the 3D mesh surface.

Example 27 includes the subject matter of Example 26, wherein the HRTF computation employs one of a boundary element based calculation, an expectation maximization based calculation, a clustering based calculation, or an anthropometric measurement based calculation.

Example 28 includes the subject matter of Examples 26 or 27, wherein the HRTF computation is performed on the image capture device.

Example 29 includes the subject matter of any of Examples 26-28, wherein the HRTF computation is performed on a cloud-based processor.

Example 30 includes the subject matter of any of Examples 26-29, further comprising means for determining an identification of the user, and storing the computed HRTF and the user identification on a cloud-based system.

Example 31 includes the subject matter of any of Examples 26-30, wherein the viewing angles of each 3D image encompass the head and upper body of the user.

Example 32 includes the subject matter of any of Examples 26-31, further comprising means for determining an identification of the user based on facial recognition applied to one or more of the 3D images of the user.

Example 33 includes the subject matter of any of Examples 26-32, further comprising means for mounting the 3D image capture device on a circular track to facilitate circumferential motion of the 3D image capture device about the user, to obtain the plurality of 3D images from the unique viewing angles.

Example 34 includes the subject matter of any of Examples 26-33, further comprising means for generating HRTF adjusted audio to provide acoustic spatial perception to the user.

The terms and expressions which have been employed herein are used as terms of description and not of limitation, and there is no intention, in the use of such terms and expressions, of excluding any equivalents of the features shown and described (or portions thereof), and it is recognized that various modifications are possible within the scope of the claims. Accordingly, the claims are intended to cover all such equivalents. Various features, aspects, and embodiments have been described herein. The features, aspects, and embodiments are susceptible to combination with one another as well as to variation and modification, as will be understood by those having skill in the art. The present disclosure should, therefore, be considered to encompass such combinations, variations, and modifications. It is intended that the scope of the present disclosure be limited not be this detailed description, but rather by the claims appended hereto. Future filed applications claiming priority to this application may claim the disclosed subject matter in a different manner, and may generally include any set of one or more elements as variously disclosed or otherwise demonstrated herein.

What is claimed is:

1. A processor-implemented method for Head-Related Transfer Function (HRTF) measurement, the method comprising:
   receiving, by a processor, one or more three-dimensional (3D) images of a user, each 3D image associated with a unique viewing angle of a 3D image capture device;
   generating, by the processor, a 3D volume based on the 3D images;
   performing, by the processor, interpolation on the 3D volume to fill one or more holes in the 3D volume associated with gaps in the 3D images;
   generating, by the processor, a 3D mesh surface based on the 3D volume; and
   computing, by the processor, an HRTF associated with the user, based on the 3D mesh surface, the HRTF for use to adjust an audio signal to provide acoustic spatial perception to the user.

2. The method of claim 1, wherein the HRTF computation employs one of a boundary element based calculation, an expectation maximization based calculation, a clustering based calculation, or an anthropometric measurement based calculation.

3. The method of claim 1, wherein the HRTF computation is performed on the image capture device.

4. The method of claim 1, wherein the HRTF computation is performed on a cloud-based processor.

5. The method of claim 1, further comprising determining an identification of the user, and storing the computed HRTF and the user identification on a cloud-based system.

6. The method of claim 1, wherein the viewing angles of each 3D image encompass the head and upper body of the user.

7. The method of claim 1, further comprising determining an identification of the user based on facial recognition applied to one or more of the 3D images of the user.

8. The method of claim 1, further comprising mounting the 3D image capture device on a circular track to facilitate circumferential motion of the 3D image capture device about the user, to obtain the plurality of 3D images from the unique viewing angles.

9. The method of claim 1, further comprising generating HRTF adjusted audio to provide acoustic spatial perception to the user.

10. A computer program product including one or more non-transitory machine-readable mediums encoded with instructions that when executed by one or more processors cause a process to be carried out for Head-Related Transfer Function (HRTF) application, the process comprising:
    identifying a user of an audio application;
    acquiring an HRTF from an HRTF storage system, the HRTF based on a 3D mesh surface generated from an interpolated 3D volume based on one or more three-dimensional (3D) images of a user;
    executing an HRTF-based audio application using the acquired HRTF to generate HRTF adjusted audio for the user; and
    providing the HRTF adjusted audio to the user through an audio headset to provide acoustic spatial perception to the user.

11. The computer program product of claim 10, wherein the HRTF storage system is cloud-based.

12. The computer program product of claim 10, wherein identifying of the user further comprises performing facial recognition.

13. A system for Head-Related Transfer Function (HRTF) measurement, the system comprising:
    a three-dimensional (3D) volume calculation circuit to generate a 3D volume based on one or more received 3D images of a user, each 3D image associated with a unique viewing angle of a 3D camera;
    a hole-filling circuit to interpolate the 3D volume to fill one or more holes associated with gaps in the 3D images;
    a 3D mesh surface generation circuit to generate a 3D mesh surface based on the 3D volume; and
    an HRTF modelling circuit to compute an HRTF associated with the user, based on the 3D mesh surface, the HRTF for use to adjust an audio signal to provide acoustic spatial perception to the user.

14. The system of claim 13, wherein the HRTF modelling circuit is further to perform one of a boundary element based calculation, an expectation maximization based calculation, a clustering based calculation, or an anthropometric measurement based calculation to compute the HRTF.

15. The system of claim 13, further comprising a user recognition circuit to determine an identification of the user, and a cloud interface circuit to store the computed HRTF and the user identification to a cloud-based system.

16. The system of claim 13, wherein the viewing angles of each 3D image encompass the head and upper body of the user.

17. The system of claim 13, further comprising a facial recognition circuit to determining an identification of the user based on facial recognition applied to one or more of the 3D images of the user.

18. At least one non-transitory computer readable storage medium having instructions encoded thereon that, when executed by one or more processors, result in the following operations for Head-Related Transfer Function (HRTF) measurement, the operations comprising:

receiving one or more three-dimensional (3D) images of a user, each 3D image associated with a unique viewing angle of a 3D image capture device;

generating a 3D volume based on the 3D images;

performing interpolation on the 3D volume to fill one or more holes in the 3D volume associated with gaps in the 3D images;

generating a 3D mesh surface based on the 3D volume; and computing an HRTF associated with the user, based on the 3D mesh surface, the HRTF for use to adjust an audio signal to provide acoustic spatial perception to the user.

19. The computer readable storage medium of claim 18, wherein the HRTF computation employs one of a boundary element based calculation, an expectation maximization based calculation, a clustering based calculation, or an anthropometric measurement based calculation.

20. The computer readable storage medium of claim 18, wherein the HRTF computation is performed on the image capture device.

21. The computer readable storage medium of claim 18, wherein the HRTF computation is performed on a cloud-based processor.

22. The computer readable storage medium of claim 18, the operations further comprising determining an identification of the user, and storing the computed HRTF and the user identification on a cloud-based system.

23. The computer readable storage medium of claim 18, wherein the viewing angles of each 3D image encompass the head and upper body of the user.

24. The computer readable storage medium of claim 18, the operations further comprising determining an identification of the user based on facial recognition applied to one or more of the 3D images of the user.

* * * * *